(12) United States Patent
Okamoto

(10) Patent No.: US 8,116,965 B2
(45) Date of Patent: Feb. 14, 2012

(54) APPARATUS FOR AND METHOD OF CONTROLLING VARIABLE VALVE MECHANISM

(75) Inventor: Naoki Okamoto, Isesaki (JP)

(73) Assignee: Hitachi, Ltd., Tokyo (JP)

( * ) Notice: Subject to any disclaimer, the term of this patent is extended or adjusted under 35 U.S.C. 154(b) by 724 days.

(21) Appl. No.: 12/204,306

(22) Filed: Sep. 4, 2008

(65) Prior Publication Data

US 2009/0088955 A1    Apr. 2, 2009

(30) Foreign Application Priority Data

Oct. 1, 2007    (JP) .................... 2007-258128

(51) Int. Cl.
*F02D 41/22*    (2006.01)
(52) U.S. Cl. .................. 701/107; 123/90.15; 123/198 D
(58) Field of Classification Search .................. 701/105, 701/107; 123/90.15, 90.19, 198 D
See application file for complete search history.

(56) References Cited

U.S. PATENT DOCUMENTS

| 6,932,034 | B2 | 8/2005 | Machida et al. | |
| 7,367,189 | B2 | 5/2008 | Ishiwatari | |
| 7,412,323 | B2* | 8/2008 | Tanaka et al. | 701/104 |
| 7,685,978 | B2* | 3/2010 | Fuwa et al. | 123/90.16 |
| 7,762,222 | B2* | 7/2010 | Tanaka et al. | 123/90.17 |
| 2004/0261738 | A1 | 12/2004 | Machida et al. | |
| 2006/0260304 | A1 | 11/2006 | Ishiwatari | |
| 2008/0289605 | A1* | 11/2008 | Ito | 123/435 |

FOREIGN PATENT DOCUMENTS

| JP | 06-249040 A | 9/1994 |
| JP | 2005-016340 A | 1/2005 |
| JP | 2005-218281 A | 8/2005 |
| JP | 2006-226155 A | 8/2006 |
| JP | 2007-224780 A | 9/2007 |
| JP | 2009-85146 * | 4/2009 |
| WO | WO 2007/099745 A1 | 9/2007 |

* cited by examiner

*Primary Examiner* — Hai Huynh
(74) *Attorney, Agent, or Firm* — Foley & Lardner LLP

(57) ABSTRACT

The present invention provides an apparatus for and method of diagnosing whether or not a failure occurs in a variable valve mechanism on the basis of a manipulated variable of an electric actuator. The variable valve mechanism is operated by the electric actuator and varies an open characteristic of an engine valve. The time for determining occurrence of a failure in the electric actuator is changed according to a temperature condition.

17 Claims, 18 Drawing Sheets

APPARATUS FOR AND METHOD OF CONTROLLING VARIABLE VALVE MECHANISM

BACKGROUND OF THE INVENTION

1. Field of the Invention

The present invention relates to an apparatus for and method of controlling a variable valve mechanism operated by an electric actuator and varying an open characteristic of an engine valve. More particularly, the invention relates to a technique for diagnosing whether or not a failure occurs in the variable valve mechanism, on the basis of a manipulated variable of the electric actuator.

2. Description of the Related Art

Japanese Laid-open (Kokai) Patent Application Publication No. H06(1994)-249040 discloses a controlling apparatus for a vehicle which controls a throttle actuator on the basis of an output of a throttle sensor, wherein when a state where drive current of the throttle actuator exceeds a threshold continues for a predetermined time or longer, it is determined that a failure occurs.

Often, in a variable valve mechanism for changing an open characteristic of an engine valve by using an electric actuator such as a motor, a duty ratio (manipulated variable) of a current supply control signal of the electric actuator may be set on the basis of a difference between a target open characteristic and an actual open characteristic.

In such a variable valve mechanism, when a movable part driven by the electric actuator becomes unmovable or the movement of the movable part becomes extremely slow due to a failure, a control error does not decrease, so that the duty ratio is set to 100% and held in this state.

Consequently, it is able to estimate the occurrence of a failure in the variable valve mechanism based on a length of duration of the state where the duty ratio is held at 100%.

However, in the state where the duty ratio is 100%, the heat generation amount of the electric actuator and a drive circuit of the electric actuator is large. If this state is left for a long time, a failure might further occur in the normal electric actuator and the normal drive circuit.

For this reason, it is desired to shorten a criterion time in the case of performing an abnormal diagnosis on the basis of the continuation period and to determine a failure early. However, the duty ration can be set to 100% even when the mechanism is normal. If the criterion time is too short, an abnormality in the variable valve mechanism might be erroneously diagnosed.

SUMMARY OF THE INVENTION

An object of the present invention is to provide an apparatus for and method of controlling a variable valve mechanism, which is capable of determining occurrence of a failure before a secondary failure occurs due to heat generation in an electric actuator and/or a drive circuit and, even if a manipulated variable temporarily increases in normal control, which is capable of preventing erroneous diagnosis of the occurrence of the failure.

To achieve this object, in the present invention, when a period in which the manipulated variable of the electric actuator is equal to or larger than a threshold continues for a criterion time or longer, it is determined that a failure occurs in the variable valve mechanism, and the criterion time is variably set according to a temperature condition of the electric actuator. As used herein, the term "criterion time" denotes a standard in time duration on which a judgment as to how long a time duration during which the manipulated variable of the electric actuator is kept at a value equal to or larger than a threshold lasts should be based.

The other objects and features of this invention will be understood from the following description with reference to the accompanying drawings.

DESCRIPTION OF THE PREFERRED EMBODIMENTS

Figure 1:
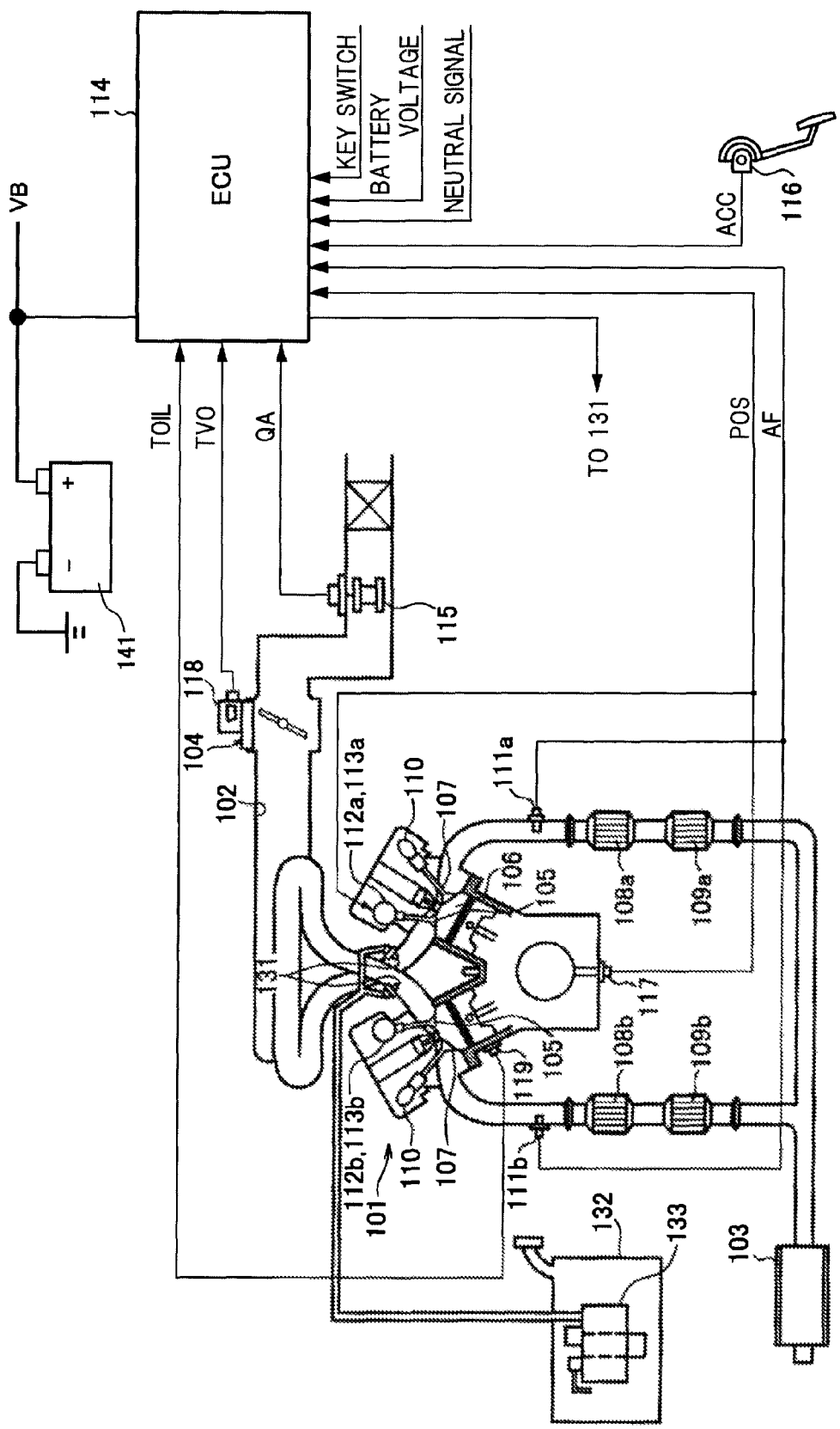
FIG. 1 is a diagrammatic view illustrating a configuration of an internal combustion engine according to an embodiment of the present invention.

In FIG. 1, an internal combustion engine 101 is a V-type engine provided with right and left banks (i.e., two cylinder groups).

Internal combustion engine 101, however, is not limited to the V-type engine but may be an in-line engine or horizontal opposed engine.

Internal combustion engine 101 is mounted on a vehicle (not shown in the figure) and serves as a power source of the vehicle. An output of internal combustion engine 101 is transmitted to drive wheels of the vehicle via a transmission (not shown).

In an intake pipe 102 in internal combustion engine 101, an electronic controlled throttle 104 is interposed, so that air passed through electronic controlled throttle 104 is distributed to banks and, further, distributed to cylinders.

In each of the cylinders, the air is introduced into a combustion chamber 106 via an intake valve 105.

Exhaust gas is exhausted from combustion chamber 106 via an exhaust valve 107. Then, the exhaust gases are collected on the bank unit basis and are subject to purification by front catalytic converter 108a, 108b and rear catalytic converter 109a, 109b provided on the bank unit basis.

The exhaust gases in the banks purified by rear catalytic converters 109a and 109b merge together, flow into a muffler 103 and, after that, are released to the atmosphere.

Exhaust valve 107 is driven by a cam provided for an exhaust camshaft 110 while maintaining a predetermined valve lift amount, a predetermined valve operation angle, and a predetermined valve timing.

On the other hand, variable valve lift mechanism 112a, 112b for continuously varying the valve lift amount of intake valve 105 together with the valve operation angle is provided on the bank unit basis.

Further, variable valve timing mechanism 113a, 113b for continuously varying the center phase of the valve operation angle of intake valve 105 is provided on the bank unit basis.

Variable valve timing mechanism 113a, 113b changes the rotation phase of the intake camshaft with respect to the crankshaft, thereby continuously varying the center phase of the valve operation angle of intake valve 105.

By variable valve lift mechanism 112a, 112b and variable valve timing mechanism 113a, 113b, as variable valve mechanisms, the open characteristic of intake valve 105 as an engine valve is made variable.

An electronic control unit (ECU) 114 incorporated therein a microcomputer controls electronic controlled throttle 104, variable valve lift mechanisms 112a and 112b, and variable valve timing mechanisms 113a and 113b so as to obtain a target intake air amount corresponding to accelerator opening or the like.

Electronic control unit 114 is arranged to receive detection signals which are output from: an air flow sensor 115 for detecting an intake air flow amount QA of internal combustion engine 101; an accelerator pedal sensor 116 for detecting a stroke amount ACC of an accelerator pedal; a crank angle sensor 117 for detecting rotation angle POS of crankshaft; a throttle sensor 118 for detecting opening angle TVO of electronic controlled throttle 104; a temperature sensor 119 for detecting a lubricating oil temperature TOIL of internal combustion engine 101; air-fuel ratio sensors 111a and 111b for detecting air-fuel ratio AF of each bank, and the like.

A fuel injection valve 131 is disposed in an intake port section on the upstream side of intake valve 105 in each of the cylinders.

The engine may be a direct-injection engine in which fuel is injected into a combustion chamber by fuel injection valve 131.

To fuel injection valve 131, fuel in a fuel tank 132 is pumped and sent by a fuel pump 133. When fuel injection valve 131 is opened by an injection pulse signal from electronic control unit 114, the fuel of an amount proportional to injection pulse width (valve opening time) is injected into internal combustion engine 101.

Next, the structure of variable valve lift mechanism 112a, 112b and variable valve timing mechanism 113a, 113b will be described with reference to FIGS. 2 through 4.

Above intake valve 105, an intake camshaft 3 rotated by the crankshaft is rotatably supported along a cylindrical column direction.

An oscillating cam 4 in contact with a valve lifter 2a of intake valve 105 and opening/closing intake valve 105 is relatively rotatably fit around intake camshaft 3.

Between intake camshaft 3 and oscillating cam 4, variable valve lift mechanism 112a, 112b for continuously changing the valve operation angle and the valve lift amount of intake valve 105 are provided.

At one end of intake camshaft 3, variable valve timing mechanism 113a, 113b is disposed, which continuously change the center phase of the valve operation angle of intake valve 105 by changing the rotation phase of intake camshaft 3 with respect to the crankshaft.

Figure 2:
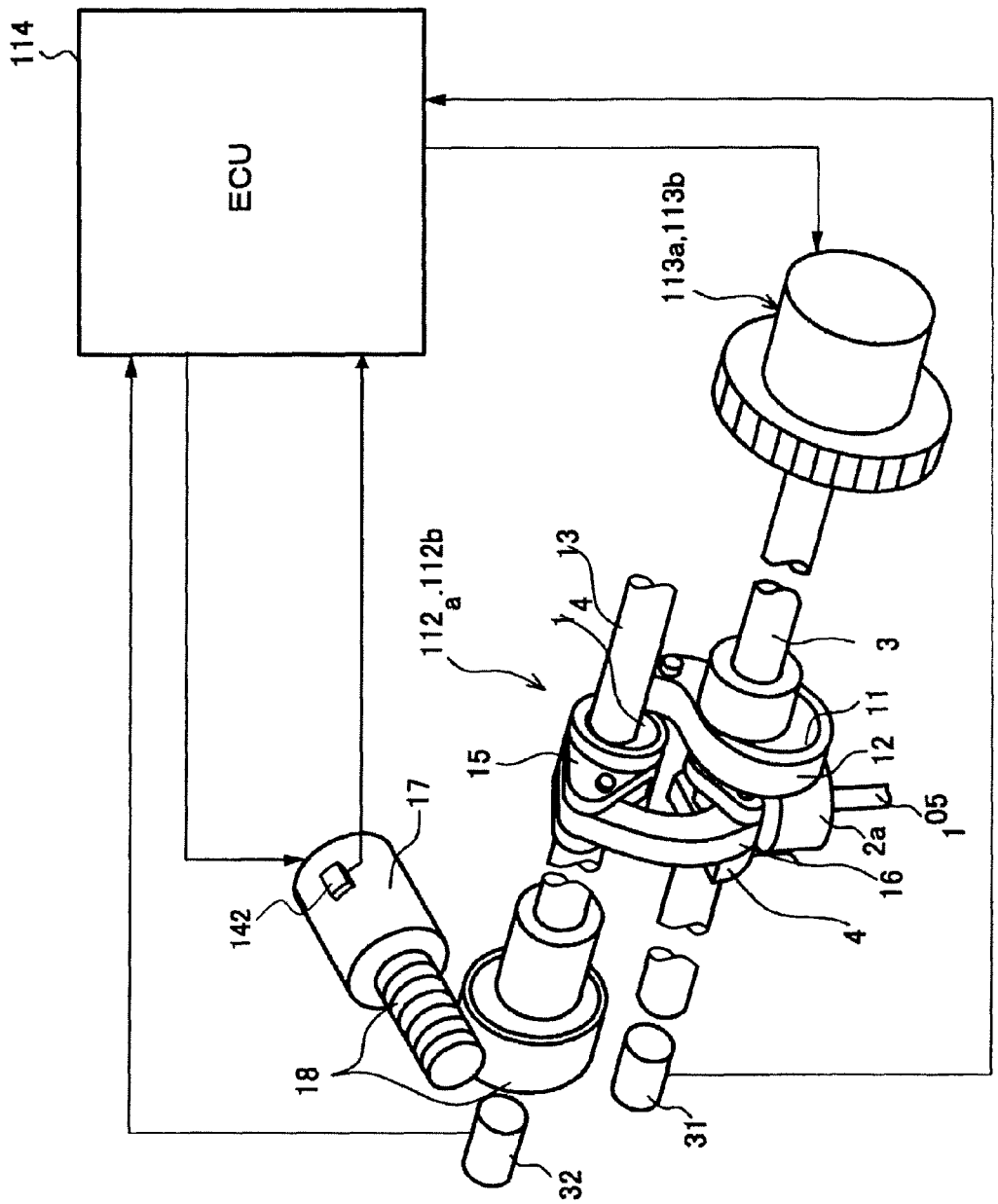
FIG. 2 is a perspective view illustrating the structure of a variable valve lift mechanism according to the embodiment of the present invention.

As shown in FIGS. 2 and 37 variable valve lift mechanism 112a, 112b has: a circular drive cam 11 eccentrically secured to intake camshaft 3; a ring-shaped link 12 relatively rotatably fit around drive cam 11; a control shaft 13 extending almost in parallel with intake camshaft 3 in the cylinder column direction; a circular control cam 14 eccentrically secured to control shaft 13; a rocker arm 15 relatively rotatably fit around control cam 14 and one end thereof is coupled to the tip of ring-shaped link 12; and a rod-shaped link 16 coupled to the other end of rocker arm 15 and oscillating cam 4.

Control shaft 13 is rotated within a predetermined control angle range via gears 18 by a motor 17 as an electric actuator.

As the motor, for example, a DC motor may be employed.

With the configuration, when intake camshaft 3 rotates in conjunction with the crankshaft, ring-shaped link 12 performs an approximately translatory motion via drive cam 11, rocker arm 15 rocks around the axis of control cam 14, oscillating cam 4 oscillates via rod-shaped link 16, and intake valve 105 is driven to open or close.

By changing the rotation angle of control shaft 13, the position of the axis of control cam 14 as the center of rocking of rocker arm 15 changes, and the orientation of oscillating cam 4 changes.

Consequently, while the center phase of the valve operation angle of intake valve 105 is made almost constant, the valve operation angle and the valve lift amount of intake valve 105 can be changed continuously.

Figure 3:
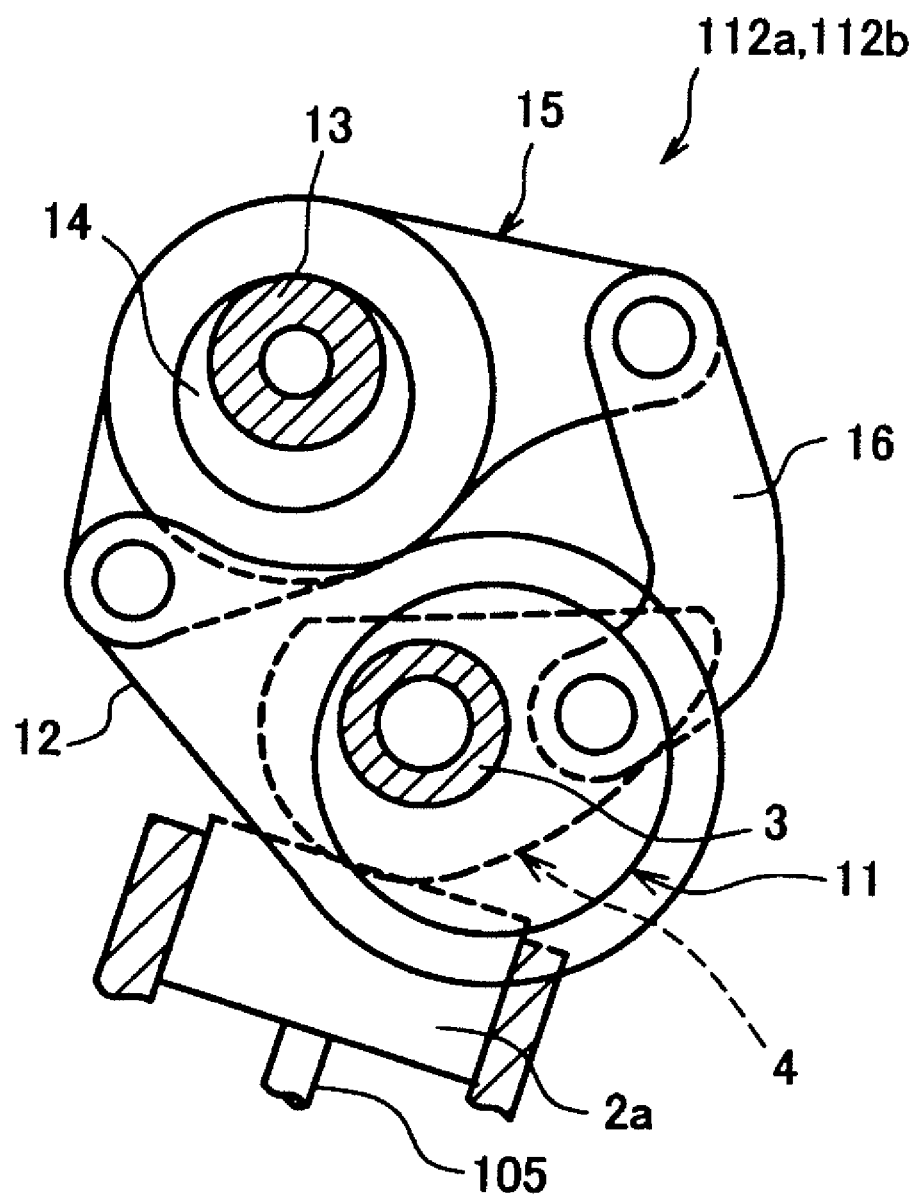
FIG. 3 is a side view of the variable valve lift mechanism.

The structure of variable valve lift mechanism 112a, 112b is not limited to that shown in FIGS. 2 and 3.

Figure 4:
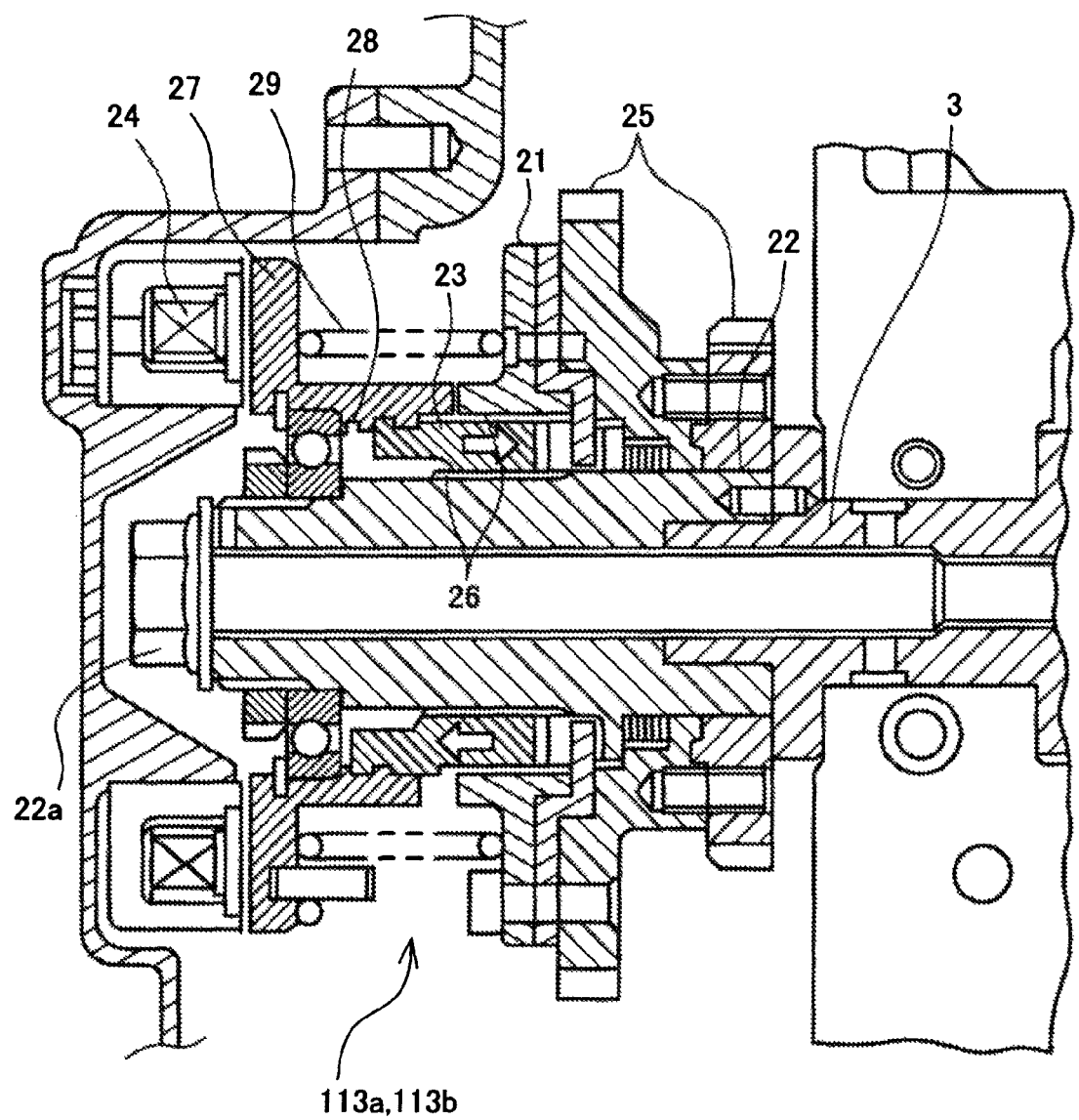
FIG. 4 is a cross sectional view illustrating a variable valve timing mechanism according to the embodiment of the present invention.

FIG. 4 shows variable valve timing mechanism 113a, 113b.

Variable valve timing mechanism 113a, 113b has: a first rotating member 21 secured to a sprocket 25 which rotates synchronously with the crankshaft and integrally rotating with sprocket 25; a second rotating member 22 secured to one end of intake camshaft 3 by a bolt 22a and rotating integrally with intake camshaft 3; and an intermediate cylindrical gear 23 which meshes with the internal peripheral surface of first rotating member 21 and the external peripheral surface of second rotating member 22 by a helical spline 26.

A drum 27 is coupled to intermediate gear 23 via a screw 28, and a torsion spring 29 is interposed between drum 27 and intermediate gear 23.

Intermediate gear 23 is spring biased to a retard direction (left direction in FIG. 4) by torsion spring 29. When a voltage is applied to an electromagnetic retarder 24 to generate a magnetic force, intermediate gear 23 is moved to an advance direction (the right direction in FIG. 4) via drum 27 and screw 28.

In accordance with the position in the axial direction of intermediate gear 23, the relative phases of rotating members 21 and 22 change, the phase of intake camshaft 3 changes with respect to the crankshaft, and the center phase of the valve operation angle of intake valve 105 continuously changes.

Motor 17 and electromagnetic retarder 24 are controlled by an operation signal from electronic control unit 114.

The structure of variable valve timing mechanism 113a, 113b is not limited to the above-described one. Any known mechanism of making the rotation phase of intake camshaft 3 variable with respect to the crankshaft can be applied. For example, a mechanism of changing the rotation phase of the camshaft with respect to the crank shaft by a motor as disclosed in Japanese Laid-open (Kokai) Patent Application Publication No. 2007-224780 may be employed. Further, a mechanism of changing the rotation phase using a hydraulic pressure may be employed.

Electronic control unit 114 calculates a target angle of control shaft 13 in accordance with an engine operating state, and feedback-controls the manipulated variable of motor 17 by the proportional plus integral plus derivative action based on the deviation between the target angle and actual angle so that the actual angle detected by angle sensor 32 becomes closer to the target angle.

In the present embodiment, by controlling the duty ratio (on-time proportion) of supply of the power to motor 17, average application voltage to motor 17 is adjusted. The duty ratio corresponds to the manipulated variable of motor 17.

The manipulated variable of motor 17 is not limited to the duty ratio but may be a manipulated variable for controlling voltage/current of motor 17.

Electronic control unit 114 is incorporated therein a motor driving circuit to which a voltage VB of a battery 141 is supplied. The motor driving circuit controls supply of battery power to motor 17 in accordance with the duty ratio.

Electronic control unit 114 detects the rotation phase of intake camshaft 3 with respect to the crank shaft on the basis of a detection signal CAM output at a predetermined angle position of intake camshaft 3 from cam sensor 31 and a detection signal POS from crank angle sensor 117, and feedback-controls the manipulated variable of electromagnetic retarder 24 by the proportional plus integral plus derivative action based on the deviation between the target angle and actual angle so that the detection result becomes closer to the target rotation phase.

The feedback control is not limited to the proportional plus integral plus derivative action. Proportional integral operation or sliding mode control can be used.

Further, electronic control unit 114 is provided with, as software, the function of diagnosing a failure in variable valve lift mechanism 112a, 112b. In the following, the failure diagnosis will be described in detail.

Here, a first electronic control unit for controlling a fuel injection amount and an ignition timing of internal combustion engine 101 and a second electronic control unit for controlling variable valve lift mechanism 112a, 112b are provided individually. The first control unit computes a target valve lift amount. The result is transmitted to the second control unit. Then, the second electronic control unit computes the duty ratio, and motor 17 is controlled thereby. In this case, a failure diagnosis which will be described later can be conducted by any of the first and second electronic control units.

Figure 5:
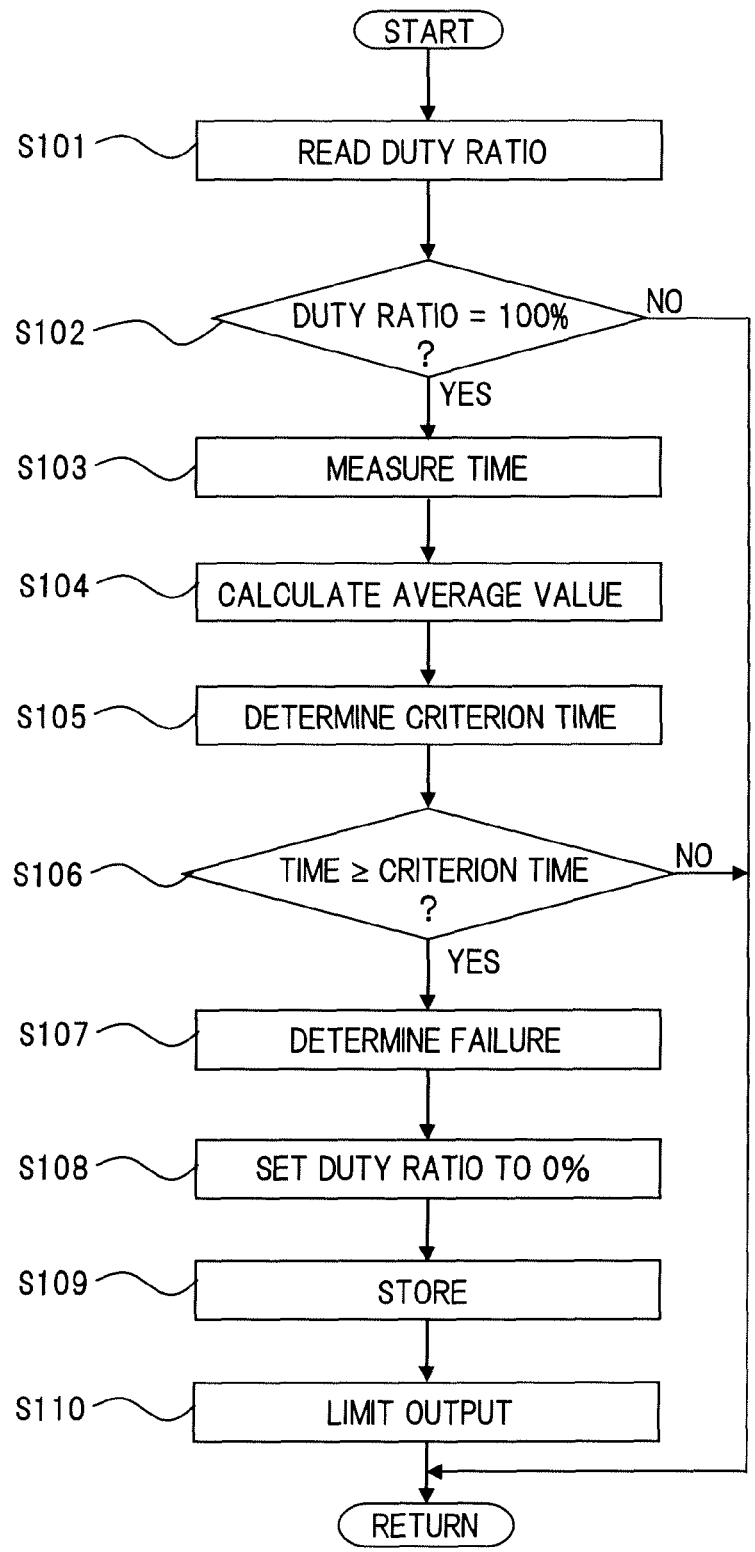
FIG. 5 is a flowchart illustrating a control according to a first embodiment of the present invention.

The flowchart of FIG. 5 shows a first embodiment of the failure diagnosis. The routine shown in the flowchart is executed at short time intervals (for example, every 10 ms). The same process is executed in parallel by each variable valve lift mechanism 112a, 112b (on the bank unit basis).

First, in step S101, the duty ratio (manipulated variable) for controlling supply of electric current of motor 17, which is determined by the feedback control is read.

In step Si 02, whether the duty ratio read in step S101 is 100% (threshold) as the maximum value or not is determined.

A state where the duty ratio is 100% is a state where the maximum voltage is applied to motor 17. Usually, even when the duty ratio becomes temporarily 100%, the duty ratio can be corrected in decreasing manner because the deviation between the target angle and the actual angle gradually decreases. Consequently, the state where the duty ratio is equal to 100% does not continue long.

On the other hand, when a foreign substance is caught in movable parts of variable valve lift mechanism 112a, 112b or when the movable parts are deformed, control shaft 13 cannot be rotated by the torque of motor 17, the rotational speed of control shaft 13 may decrease, and the control deviation may be held large.

When the control deviation is not reduced, the duty ratio is gradually increased by the integral action and is, finally, held at 100%. Consequently, when the state where the duty ratio is equal to 100% continues long, it can be estimated that a failure such as catching of a foreign substance or deformation in the movable parts in variable valve lift mechanism 112a, 112b occur.

In the present embodiment, therefore, it is determined whether or not a failure occurs in variable valve lift mechanism 112a, 112b on the basis of the length of the period in which the duty ratio is held at 100%.

In the case where the maximum value of the duty ratio is limited to be less than 100%, the maximum value in the limitation range may be set as a threshold, and it may be determined whether the duty ratio coincides with the threshold or not.

A value close to the maximum value may be further set as a threshold and it may be determined whether the duty ratio is equal to or higher than the threshold or not. For example, when the maximum value is 100%, it may be determined whether the duty ratio is equal to or higher than 90% or not.

Here, the determination of whether the duty ratio coincides with the maximum value or not is substantially the same to a determination of whether the duty ratio is the maximum value or higher.

When it is determined in step S102 that the duty ratio is 100%, the control proceeds to step S103 where time period in which the duty ratio is held at 100% is measured.

In step S104, an average value of voltages of battery 141 during the period in which the duty ratio is held at 100% is calculated.

The average value of the voltages may be a simple average value obtained by dividing an integration value of battery voltages detected since the duty ratio became 100% by the number of samples, a weighted average value obtained by performing weighted averaging on the immediately preceding average value and the latest detection value, or a value obtained by digital or analog low-pass filter process.

In step S105, a criterion of time in which the duty ratio is held at 100% is set on the basis of the voltage average value.

Specifically, as the criterion time, the time in which the duty ratio is held at 100% is time which is determined to be long enough to estimate occurrence of a failure or not. As will be described later, when the time in which the duty ratio is held at 100% becomes equal to or longer than the criterion time, occurrence of a failure in the variable valve lift mechanism 112a, 112b is determined.

By setting the criterion time on the basis of an average value of power source voltages, even if the power source voltage fluctuates, the criterion time suited to an amount of heat generated by motor 17 and the like can be set.

Figure 6:
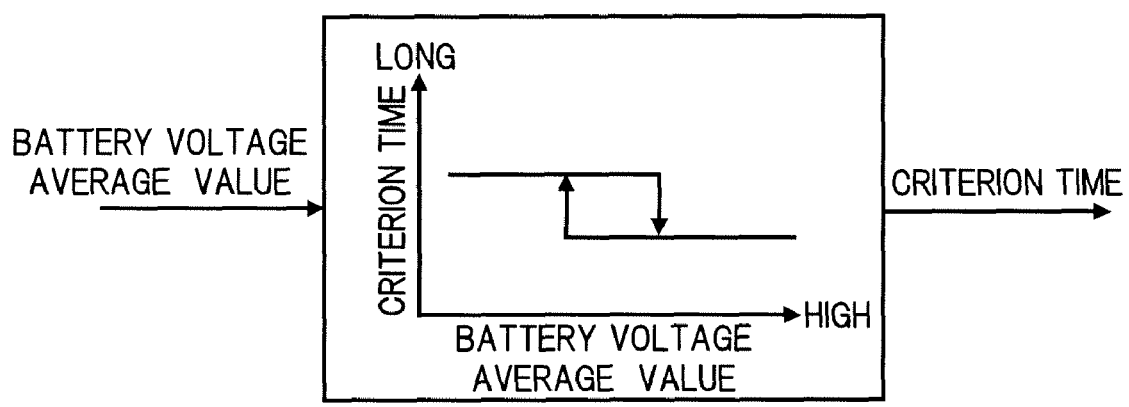
FIG. 6 is a block diagram illustrating a setting of criterion time according to the first embodiment.

A criterion time is set on the basis of an average value of the power source voltages, for example, as shown in FIG. 6.

In an example of FIG. 6, one of two pre-set criteria is selected according to an average value of the power source voltages. In an area where the average value of power source voltages is high, the shorter criterion time is selected. In an area where the average value of power source voltages is low, the longer criterion time is selected. Therefore, the criterion time can be easily set.

While the duty ratio is held at 100%, the average value of the power source voltages is updated sequentially. By setting the average voltage for switching the shorter criterion time to the longer criterion time to be lower than an average voltage for switching the longer criterion time to the shorter criterion time so that hunting does not occur in the criterion time, a hysteresis characteristic is provided, and occurrence of the hunting is prevented.

The higher the application voltage (power source voltage) is, the larger the heat amount in motor 17 and the drive circuit of motor 17 becomes, and the temperature of motor 17 and the drive circuit easily exceeds an operating temperature limit. When the criterion time is long and the state where the duty ratio is held at 100% is allowed to be long, there is the possibility that motor 17 and the drive circuit which are normal may be damaged.

The operating temperature limit denotes an allowable maximum temperature at which the performance can be maintained and parts are not damaged.

The higher the application voltage of motor 17 is, the higher the rotating torque of motor 17 is. When the rotating torque is high, it is expected that the motion of control shaft 13 advances. In the case where the power source voltage is high, occurrence of a failure is estimated in a state where time in which the duty ratio is held at 100% is shorter than in the case where the power source voltage is low.

Therefore, when the power source voltage of motor 17 is high, the criterion time is set to be short so that the failure determination is performed in a short time. By execution of a fail-safe process based on the failure determination, a control state at the duty ratio of 100% is cancelled. As a result, occurrence of a secondary failure due to heat generation of motor 17 and the drive circuit of motor 17 can be avoided, and the precision of failure diagnosis can be maintained.

Therefore, the criterion time according to the average voltage is set to almost the maximum time in a range where occurrence of a secondary failure due to heat generation can be avoided.

Figure 7:
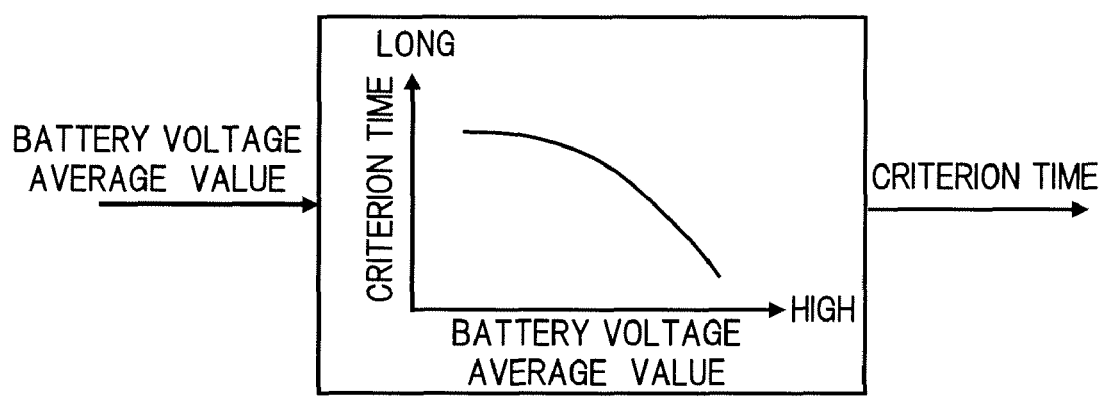
FIG. 7 is a block diagram illustrating a setting of criterion time according to the first embodiment.

The criterion time can be simply set shorter as the average voltage (power source voltage) increases. The criterion time adapted to the average voltage at a given time can be retrieved from a table that pre-stores the criterion time for the average voltage as shown in FIG. 7.

By obtaining the criterion time with reference to the table as described above, the criterion time can be changed more finely with changes in the average voltage (power source voltage). Even in the case where the correlation between the average time and the criterion time cannot be approximated by a simple relational form, a desired criterion time can be set for the average voltage.

The criterion time can be also set by computation of a linear function using the average voltage as a variable.

In the case of changing the criterion time in almost proportional to the average voltage, by obtaining the criterion time by the linear function computation, the criterion time can be easily set.

Although the criterion time is set on the basis of the average voltage in the state where the duty ratio is 100% in the above case, the criterion time can be set according to a battery voltage (power source voltage) at a given time, as a simple method. It is also possible to store the battery voltage (power source voltage) at the time point when the duty ratio reaches 100% and set the criterion time on the basis of the storage value. Those methods can be similarly employed also in an embodiment to be described later, of setting the criterion time using the power source voltage.

After setting the criterion time on the basis of the average voltage in step S105, in the following step S106, it is determined whether or not the time in which the duty ratio is held at 100% is equal to or longer than the criterion time set in step S105.

In the case where the time in which the duty ratio is held at 100% is shorter than the criterion time, there is the possibility that the duty ratio is temporarily 100% due to a large control deviation although variable valve lift mechanisms 112a and 112b are normal. Consequently, the routine is finished without performing the failure determination.

On the other hand, when the continuation time is equal to or longer than the criterion time, it is estimated as follows. A failure occurs in motor 17 or a movable part driven by motor 17, and control shaft 13 is not rotated by motor 17 or the rotation of control shaft 13 is low, so that the control deviation is not reduced, and the duty ratio is held at 100%. The control proceeds to step S107 where a signal indicative of occurrence of a failure in variable valve lift mechanism (variable valve mechanisms) 112a, 112b is output.

When occurrence of a failure is determined, in the following step S108, the duty ratio is forcedly set to 0% to interrupt power supply to motor 17 and to stop heat generation in motor 17 and the drive circuit, thereby preventing the temperature of motor 17 and the drive circuit from exceeding the operating temperature limit.

Instead of interrupting power supply to motor 17 by forcedly setting the duty ratio to 0%, the voltage application to motor 17 may be continued by setting the maximum duty ratio at which the temperature of motor 17 and the drive circuit does not exceed the operating temperature limit, in accordance with the power source voltage at a given time, and by limiting the duty ratio to be equal to or less than the maximum duty ratio.

In the case of continuing the application of voltage to motor 17 by limiting the duty ratio, an inherent target may be used as the target valve lift amount. However, it is preferable to set the minimum valve lift amount or a predetermined value around the minimum valve lift amount as the target value.

In the case where the valve lift amount can be changed in spite of the fact that the response speed becomes lower than that in normal condition, by setting the target valve lift amount to the minimum or a value around the minimum, the intake air volume can be suppressed, and generation of excessively high engine output can be avoided.

After performing the process of limiting the duty ratio in step S108, in the following step S109, the data indicating that the failure determination is made is stored in a memory, and a warning device such as a lamp for alerting the driver to the failure determination is operated.

In step S110, an engine output is limited by fixing or limiting the throttle opening, fuel injection amount, and ignition timing.

In particular, in the case where the valve lift amount cannot be varied and control shaft 13 became unmovable on the side of high valve lift amount, it is preferable to limit the engine output to the reference engine output or less by choking the opening of the throttle valve or decreasing the fuel injection amount or retarding the ignition timing.

In the case where control shaft 13 becomes unmovable in a position where the valve lift amount is an intermediate amount or less, the intake air amount of engine 101 can be controlled by controlling the throttle opening.

In a V-type engine like in the embodiment, in the case where variable valve lift mechanism 112a, 112b of one of the banks fails, occurrence of a large difference between torques generated in the banks can be avoided by controlling the normal valve lift amount of variable valve lift mechanism 112a, 112b of the other bank in a manner that can make the normal valve lift amount coincide with the valve lift amount of the failed one.

In the case where the valve lift amount in the bank in which variable valve lift mechanism 112a, 112b fails is small, if the valve lift amount in the normal bank is adjusted to the valve lift amount in the bank where the failure occurs, there is a case that the torque generated in the engine as a whole is insufficient.

In this case, by increasing the valve lift amount in the normal bank to be larger than the valve lift amount in the bank where the failure occurs within the range where an excessive difference in the generated torques between the banks does not occur, insufficiency of the torque can be suppressed.

Figure 8:
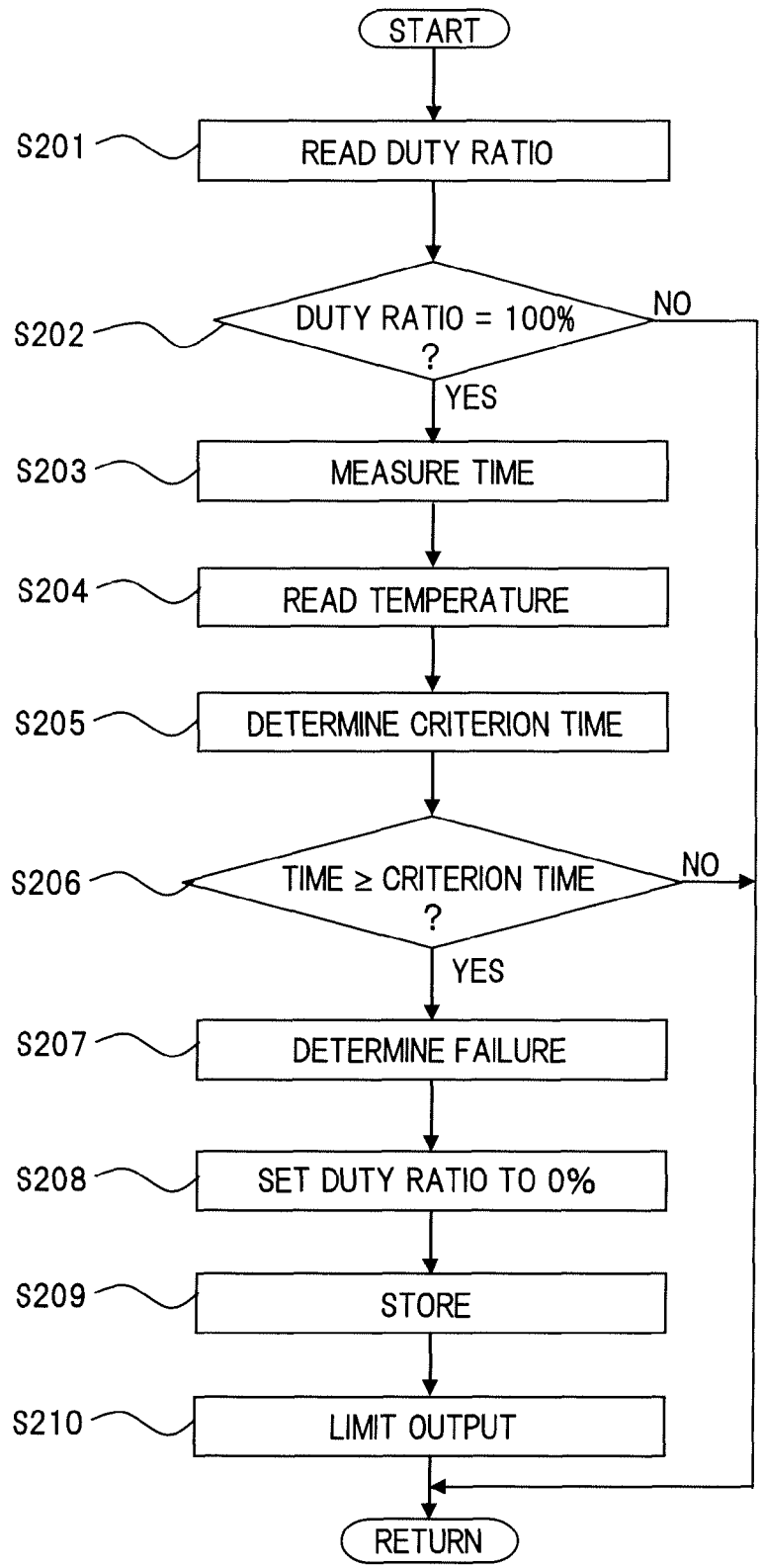
FIG. 8 is a flowchart illustrating a control according to a second embodiment of the present invention.

The flowchart of FIG. 8 shows a second embodiment of the failure diagnosis and is different from the first embodiment only with respect to the setting of the criterion time. Steps in which the same processes are performed will be briefly described.

In step S201, the duty ratio is read. In step S202, whether the duty ratio is 100% or not is determined.

If the duty ratio is 100%, the control proceeds to step S203 where time in which the duty ratio is held at 100% is measured.

In the following step S204, lubricating oil temperature of internal combustion engine 101 detected by temperature sensor 119 is read.

Alternatively, cooling water temperature in internal combustion engine 101 may be detected by temperature sensor 119 and read in step S205 in place of the lubricating oil temperature.

In step S205, the criterion time is set on the basis of the lubricating oil temperature or cooling water temperature.

The lubricating oil temperature or cooling water temperature represents the engine temperature and is the environment temperature of motor 17. A setting is made so that the higher the lubricating oil temperature or the cooling water temperature is, the shorter the criterion time is.

As the environment temperature of motor 17, other than the above, the temperature of the cylinder block, the temperature in the engine room, or the like can be used.

When voltage is continuously applied to motor 17, motor 17 or the drive circuit of motor 17 generates heat. There is a tendency that the higher the environment temperature of motor 17 is, the higher the temperature in motor 17 and the drive circuit of motor 17 is. Consequently, the temperature of motor 17 and the drive circuit can easily exceed an operating temperature limit. There is the possibility that a secondary failure, which may cause damages to motor 17 and the drive circuit which are normal, occurs.

In the case where the lubricating oil temperature or cooling water temperature is high and the environment temperature of motor 17 is high, the criterion time is shortened to avoid occurrence of a secondary failure due to heat generation in motor 17 or the drive circuit of motor 17.

Figure 9:
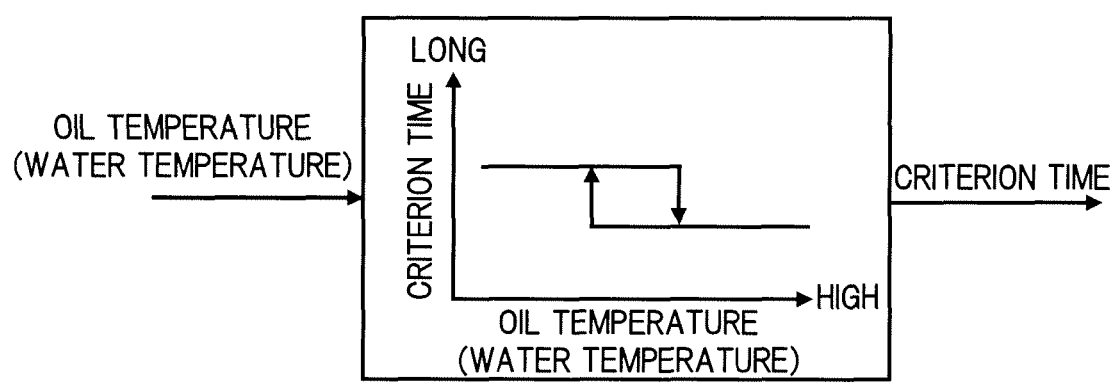
FIG. 9 is a block diagram illustrating a setting of criterion time according to the second embodiment.

As a process of setting the criterion time based on the lubricating oil temperature or cooling water temperature, as shown in FIG. 9, in an area where the temperature is high, the shorter criterion time is selected. In contrast, in an area where the temperature is low, the longer criterion time is selected.

By setting the temperature at which the shorter criterion time is switched to the longer criterion time to be lower than the temperature at which the longer criterion time is switched to the shorter criterion time so that hunting does not occur in a binary selection state even if the lubricating oil temperature or cooling water temperature fluctuates while the duty ratio is held at 100%, a hysteresis characteristic is provided, and occurrence of the hunting is prevented.

Figure 10:
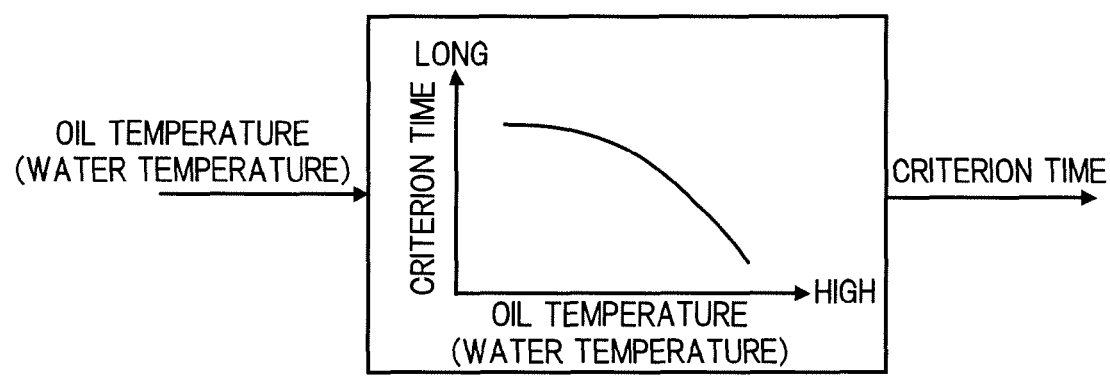
FIG. 10 is a block diagram illustrating a setting of criterion time according to the second embodiment.

As shown in FIG. 10, the criterion time adapted to the lubricating oil temperature or cooling water temperature at a given time can be retrieved from a table that pre-stores the criterion time with respect to the lubricating oil temperature or cooling water temperature.

In the configuration of retrieving the criterion time from the table as described above, the criterion time can be changed more finely with changes in the lubricating temperature or cooling water temperature. Even in the case where the correlation between the lubricating oil temperature or cooling water temperature and the criterion time cannot be approximated by a simple relational form, a desired criterion time can be set for the temperature.

The setting of criterion time based on the lubricating oil temperature or cooling water temperature can be also made by computation of a linear function using the lubricating oil temperature or the cooling water temperature as a variable.

In the case of changing the criterion time in almost proportional to the lubricating oil temperature or cooling water temperature, by obtaining the criterion time by the linear function computation as described above, the criterion time can be easily set.

In the case of setting the criterion time on the basis of the lubricating oil temperature or cooling water temperature, an average value of temperatures while the duty ratio is held at 100% is obtained, and the criterion time can be set on the basis of the average value. The method can be similarly employed also in another below-mentioned embodiment of setting the criterion time on the basis of the lubricating oil temperature or cooling water temperature.

In step S206, it is determined whether or not the time in which the duty ratio is held at 100% is equal to or longer than the criterion time set on the basis of the lubricating oil temperature or cooling water temperature. In the case where the time is equal to or longer than the criterion time, the control proceeds to step S207 where the failure determination is performed.

In steps S208 through S210, a fail-safe process similar to that in the steps S108 through S110 is executed.

Figure 11:
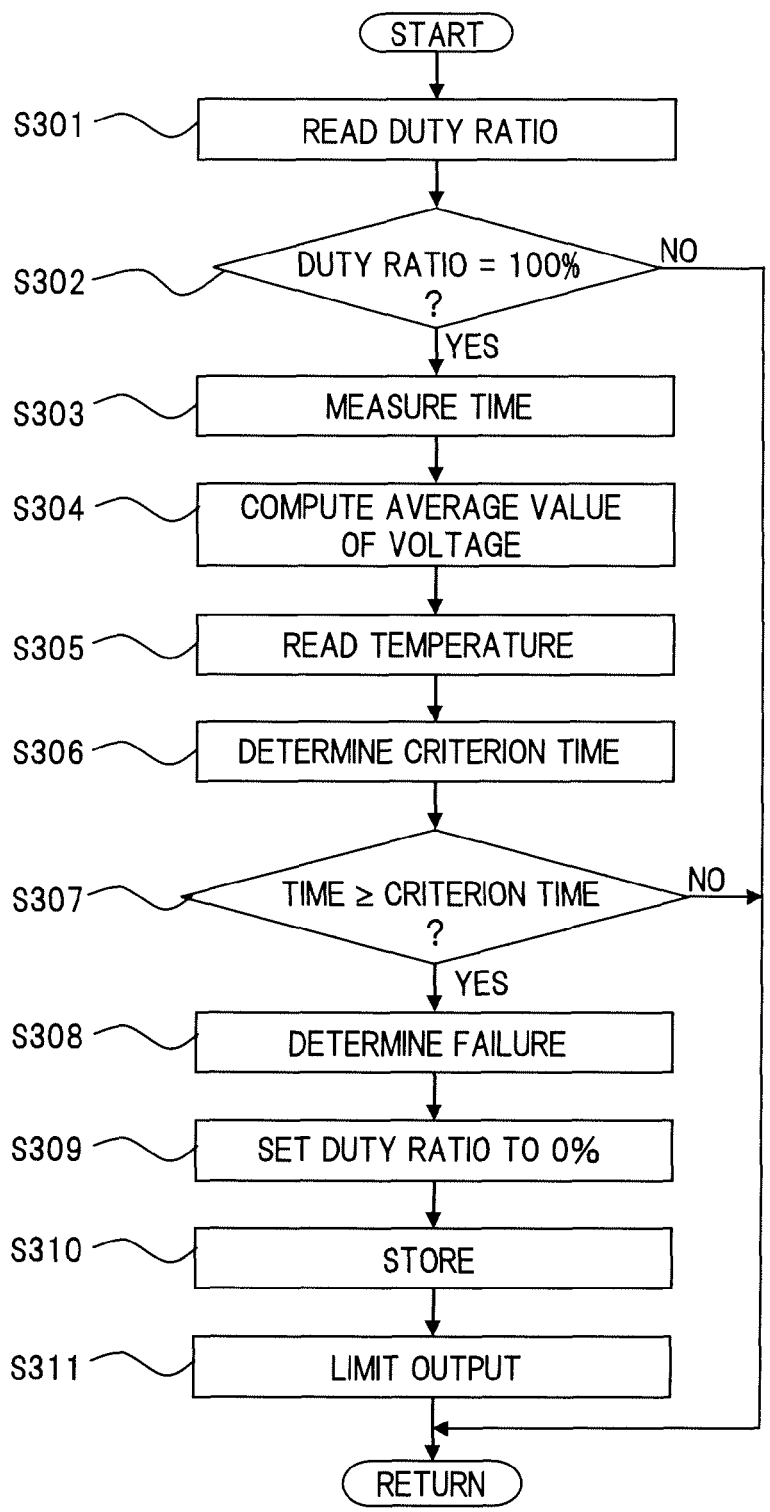
FIG. 11 is a flowchart illustrating a control according to a third embodiment of the present invention.

The flowchart of FIG. 11 shows a third embodiment of the failure diagnosis, which is characterized in that the criterion time is set on the basis of the power source voltage of motor 17 and the lubricating oil temperature or cooling water temperature as the environment temperature of motor 17. Steps in which the same processes as those in the first embodiment shown in the flowchart of FIG. 5 are performed will be briefly described.

In step S301, the duty ratio is read. In step S302, whether the duty ratio is 100% or not is determined.

If the duty ratio is 100%, the control proceeds to step S303 where time in which the duty ratio is held at 100% is measured.

In step S304, in a manner similar to the step S104, an average value of voltages of battery 141 in a period in which the duty ratio is held at 100% is calculated.

In step S305, the lubricating oil temperature of internal combustion engine 101 detected by temperature sensor 119 is read.

Alternatively, the cooling water temperature in internal combustion engine 101 may be detected by temperature sensor 119 and read in step S305, in place of the lubricating oil temperature.

In step S306, the criterion time is set on the basis of the average voltage and the temperature.

As described above, when voltage is continuously applied to motor 17, the higher the voltage is, the more heat is generated in motor 17 or the drive circuit of motor 17. There is a tendency that the higher the environment temperature of motor 17 is, the higher the temperature in motor 17 and the drive circuit of motor 17 is. The temperature of motor 17 and the drive circuit can easily exceed an operating temperature limit. Consequently, if the criterion time is long, there is the possibility that a secondary failure, which may cause damages to motor 17 and the drive circuit which are normal, occurs.

Therefore, the higher the average voltage is and the higher the temperature is, the shorter the criterion time is set.

Figure 12:
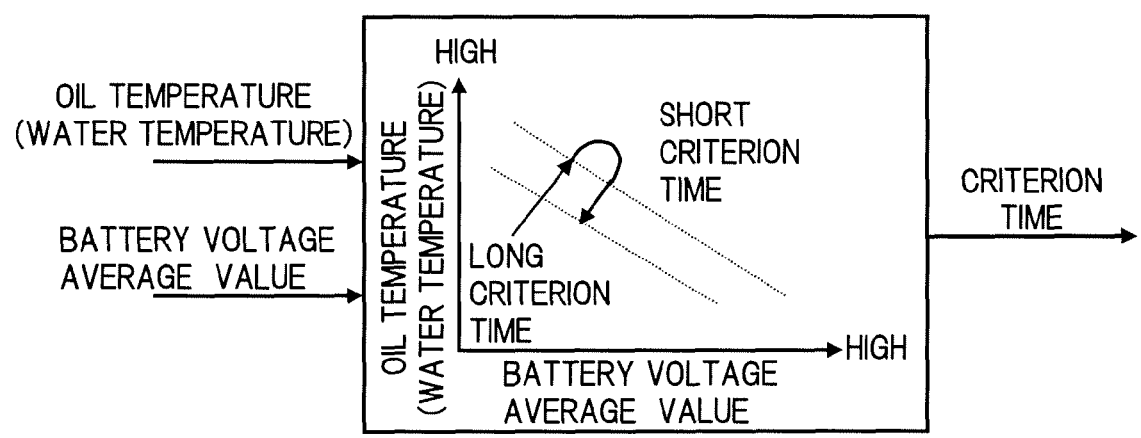
FIG. 12 is a block diagram illustrating a setting of criterion time according to the third embodiment.

As a process of setting the criterion time based on the average voltage and the temperature, as shown in FIG. 12, a two-dimensional area specified by the average voltage and the time is divided into an area of selecting shorter criterion time and an area of selecting longer criterion time. One of the two criterion times can be selected by the area to which the average voltage and temperature at a given time belong.

The area is divided to an area where the average voltage is high and the temperature is high, and an area where the average voltage is low and the temperature is low.

Further, by setting the voltage and temperature at which the shorter criterion time is switched to the longer criterion time to be lower than the voltage and temperature at which the longer criterion time is switched to the shorter criterion time so that hunting does not occur in a binary selection state even if the average voltage and temperature fluctuate while the duty ratio is held at 100%, a hysteresis characteristic is provided, and occurrence of the hunting is prevented.

Figure 13:
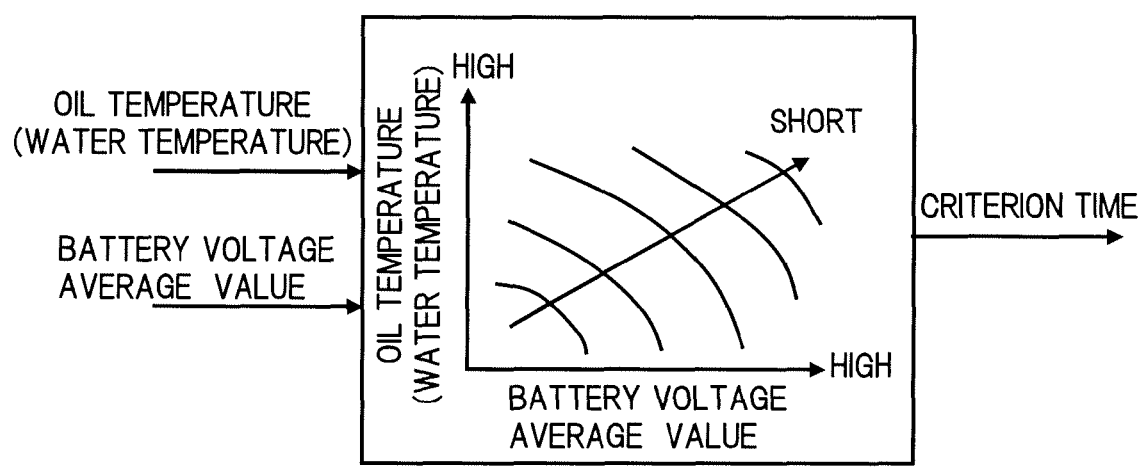
FIG. 13 is a block diagram illustrating a setting of criterion time according to the third embodiment.

As shown in FIG. 13, a map for storing the criterion time employing the average voltage and temperature as variables is provided. The criterion time adapted to the average voltage and the temperature at a given time can be retrieved from the map.

The map is set so that the higher the average voltage is and the higher the temperature is, the shorter the criterion time becomes.

In the case where the map is provided, the criterion time can be changed more finely with changes in the average voltage and the temperature. Even in the case where the correlation between the average voltage and the temperature and the criterion time cannot be approximated by a simple relational form, a desired criterion time can be set for the average voltage and the temperature.

Further, by employing the configuration of calculating the criterion time on the basis of a linear function using the average voltage as a variable and setting the gradient (gain) of the linear function in accordance with the lubricating oil temperature or cooling water temperature, the higher the average voltage is and the higher the temperature is, the shorter criterion time can be set.

In the case of changing the criterion time in almost proportional to the average voltage for each temperature, by obtaining the criterion time by the linear function computation as described above, the criterion time can be easily set.

After setting the criterion time on the basis of the average voltage and the temperature in step S306, in step S307, it is determined whether or not the time in which the duty ratio is held at 100% is equal to or longer than the criterion time set in step S306.

In the case where the time is equal to or longer than the criterion time, the control proceeds to step S308 where the failure determination is performed.

In steps S309 through S311, a fail-safe process similar to that in the steps S108 through S110 is executed.

Figure 14:
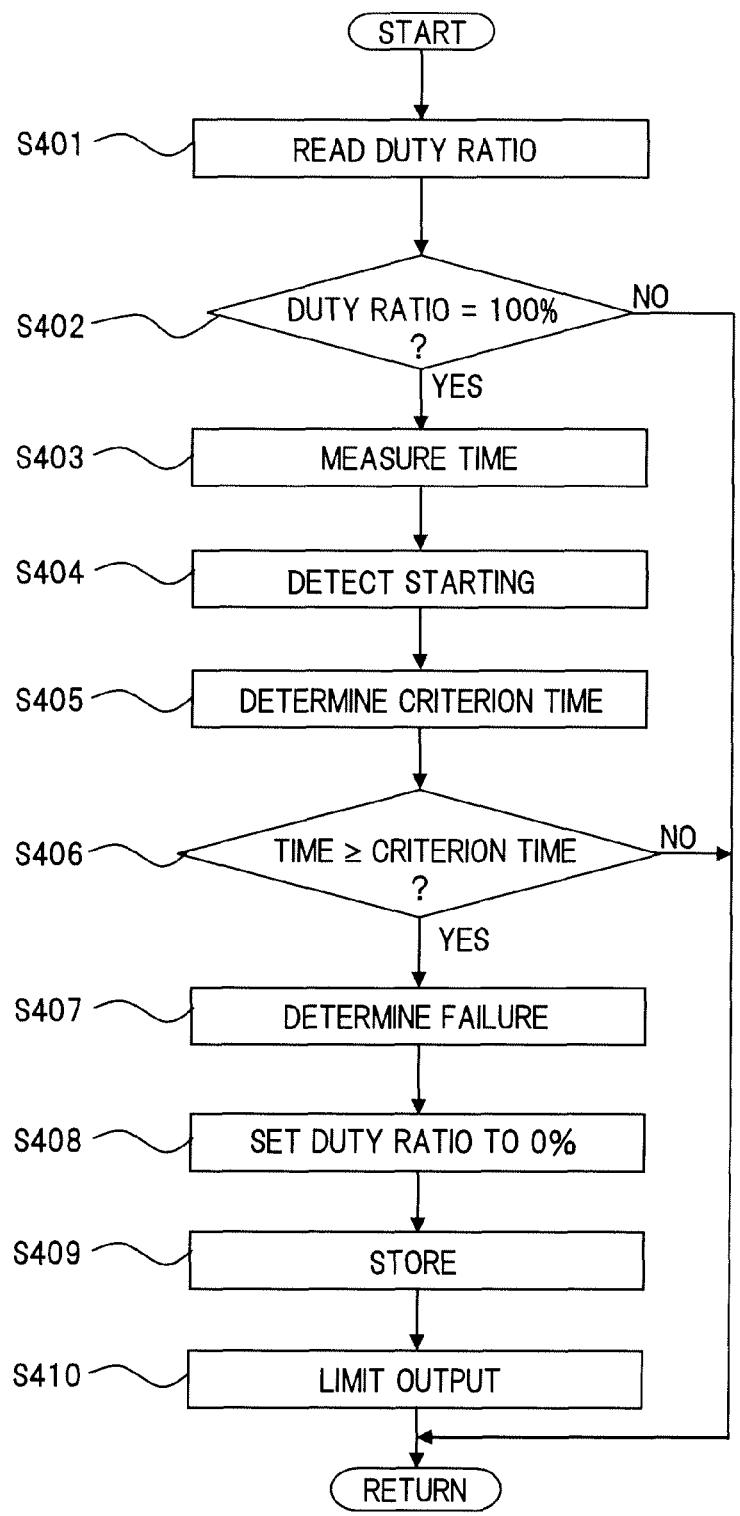
FIG. 14 is a flowchart illustrating a control according to a fourth embodiment of the present invention.

The flowchart of FIG. 14 shows a fourth embodiment of the failure diagnosis, which is characterized in that the criterion time is set on the basis of whether internal combustion engine 101 is in a start state or not. Steps in which the same processes as those in the first embodiment of the flowchart of FIG. 5 are performed will be briefly described.

In step S401, the duty ratio is read. In step S402, whether the duty ratio is 100% or not is determined.

If the duty ratio is 100%, the control proceeds to step S403 where time in which the duty ratio is held at 100% is measured.

In step S404, whether internal combustion engine 101 is starting or not is determined.

Concretely, the on state of a start switch (the on state of a starter motor) is determined as a starting state. The off state of the start switch (the off state of the starter motor) is determined as a state after starting.

From the engine speed, the acceleration of the engine speed, or the like, whether internal combustion engine 101 is starting or started can be determined.

Further, a period from turn-on of the start switch until lapse time since the turn on reaches predetermined time can be determined as the starting state. A period after the predetermined time can be determined as the state after completion of starting.

In step S405, the criterion time is set on the basis of the determination result of the start state in the step S404.

Figure 15:
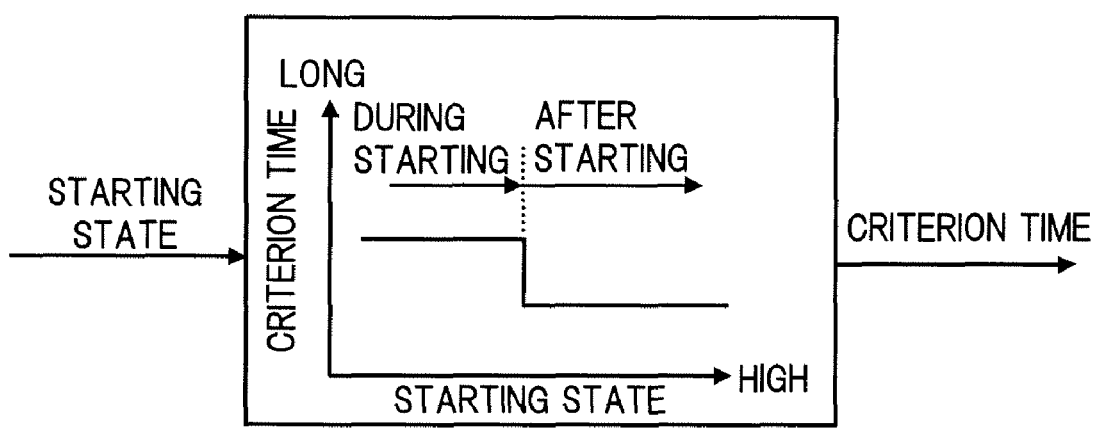
FIG. 15 is a block diagram illustrating a setting of criterion time according to the fourth embodiment.

Concretely, as shown in FIG. 15, during the starting, the criterion time is set to be long. After the completion of starting, the criterion time is shortened.

During the starting, the power generation amount of an alternator driven by the engine is small and, moreover, power consumption by the starter motor is large, and the voltage of battery 141 is lower than that after starting. Consequently, even if the duty ratio is held at 100%, the heat generation amount of motor 17 is low.

Further, the temperature of motor 17 and the environment temperature of motor 17 during starting are lower than those after the starting, even if the criterion time is increased, the temperature of motor 17 can be prevented from exceeding the operating temperature limit.

At the time of restarting after idle stop, the environment temperature may be maintained relatively high. In such a case, the criterion time may be set short like after the starting.

In the case of restarting the engine by the starter motor after idle stop, power consumption by the starter motor is large and the voltage of battery 141 becomes lower than that after the starting. Consequently, the criterion time may be set long.

On the other hand, in the case of restarting the engine without using the starter motor after the idle stop, the power is not consumed by the starter motor and the voltage of battery 141 does not drop, the criterion time can be set short.

Here, the idle stop is a function of automatically stopping the engine when the vehicle stops at a traffic signal or the like.

As a method of restarting the engine without using the starter motor after idle stop, another method of directly injecting fuel into a cylinder in the engine, burning the fuel, pressing down a piston using the energy of blowup, and restarting the engine, may be adopted.

On the other hand, after the starting, power is generated by the alternator and the starter motor is stopped, so that battery voltage is restored. Even in the state where the duty ratio is 100%, the voltage applied to motor 17 increases, and the heat generation amount of motor 17 increases. Moreover, as the engine temperature rises, the temperature of motor 17 and the environment temperature of motor 17 become higher than those during starting. Consequently, after the starting, there is the possibility that the temperature of motor 17 exceeds the operating temperature limit in time shorter than that during the starting.

Therefore, the criterion time is set to be long during starting to prevent erroneous determination of a failure. On the other hand, after the starting, the criterion time is set to be shorter. By doing so, while avoiding occurrence of a secondary failure caused when the motor temperature exceeds the operating temperature limit, the reliability of the failure diagnosis is assured.

In step S406, whether or not the time in which the duty ratio is held at 100% is equal to or longer than the criterion time set on the basis of determination of the start state is determined. When the time is equal to or longer than the criterion time, the program advances to step S407 where the failure determination is performed.

In steps S408 through S410, a fail-safe process similar to that in the steps S108 through S110 is executed.

Figure 16:
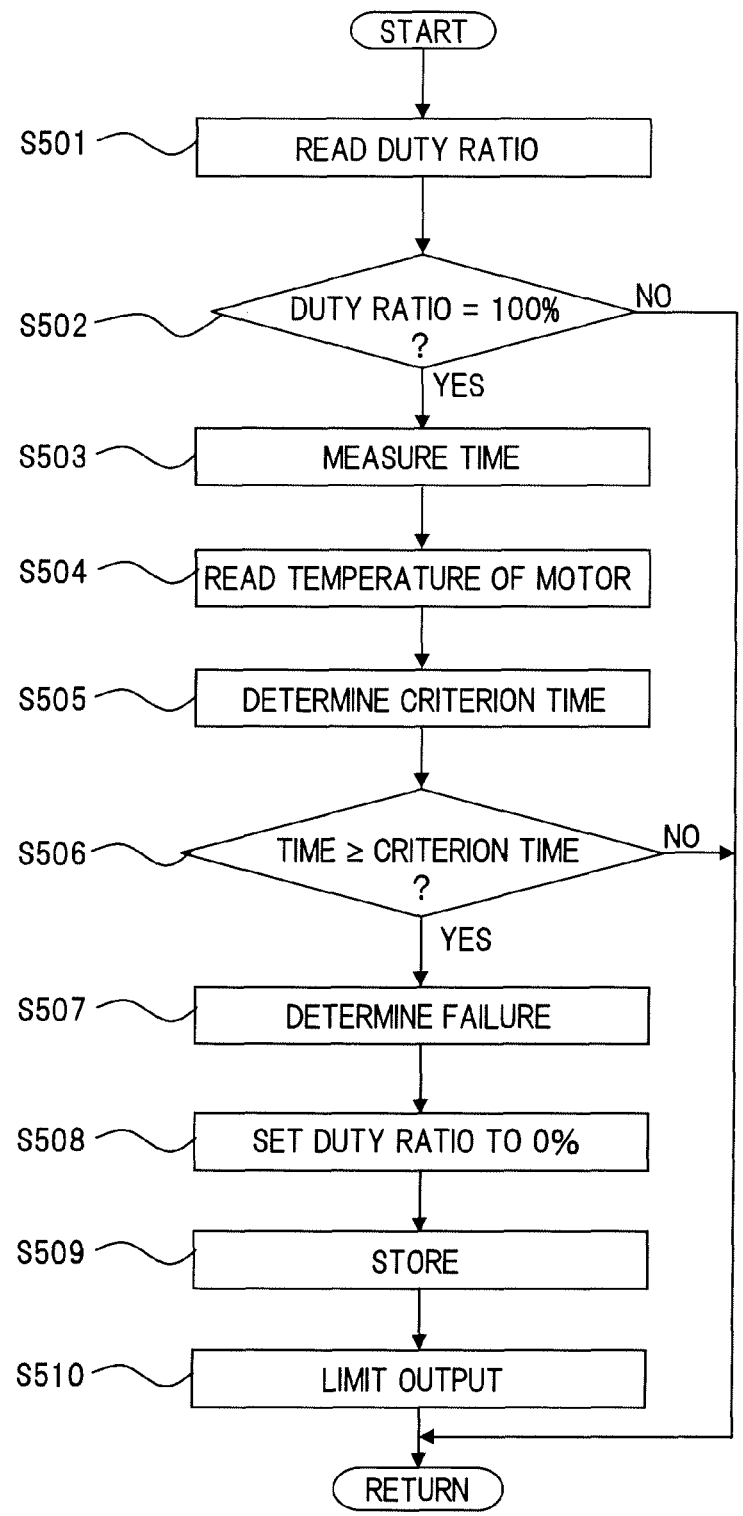
FIG. 16 is a flowchart illustrating a control according to a fifth embodiment of the present invention.

The flowchart of FIG. 16 shows a fifth embodiment of the failure diagnosis, which is characterized by providing temperature sensor 142 for detecting the temperature of motor 17 as shown in FIG. 2 and setting the criterion time on the basis of the temperature of motor 17 detected by temperature sensor 142. Steps in which the same processes as those in the first embodiment shown in the flowchart of FIG. 5 are performed will be briefly described.

In step S501, the duty ratio is read. In step S502, whether the duty ratio is 100% or not is determined.

If the duty ratio is 100%, the control proceeds to step S503 where time in which the duty ratio is held at 100% is measured.

In step S504, the temperature of motor 17 detected by temperature sensor 142 is read.

In step S505, the criterion time is set on the basis of the temperature of motor 17 read in step S504.

When voltage is continuously applied to motor 17, motor 17 or the drive circuit of motor 17 generates heat. The higher the temperature of motor 17 is, the temperature of motor 17 and the drive circuit of motor 17 tends to be high, and the temperature of motor 17 and the drive circuit easily exceeds an operating temperature limit. There is the possibility that a secondary failure, which may cause damages to motor 17 and the drive circuit which are normal, occurs.

Therefore, when the temperature of motor 17 is high, the criterion time is shortened, thereby avoiding occurrence of a secondary failure due to heat generation of motor 17 or the drive circuit of motor 17.

Figure 17:
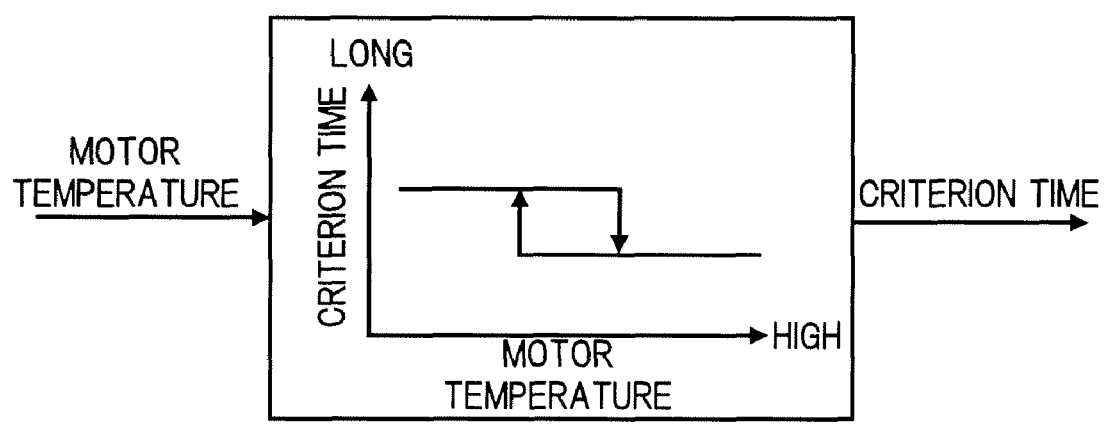
FIG. 17 is a block diagram illustrating a setting of criterion time according to the fifth embodiment.

As a process of setting the criterion time based on the temperature of motor 17, as shown in FIG. 17, one of the two criterion times can be selected on the basis of the motor temperature. In an area where the motor temperature is high, the shorter criterion time is selected. In an area where the motor temperature is low, the longer criterion time is selected.

Figure 18:
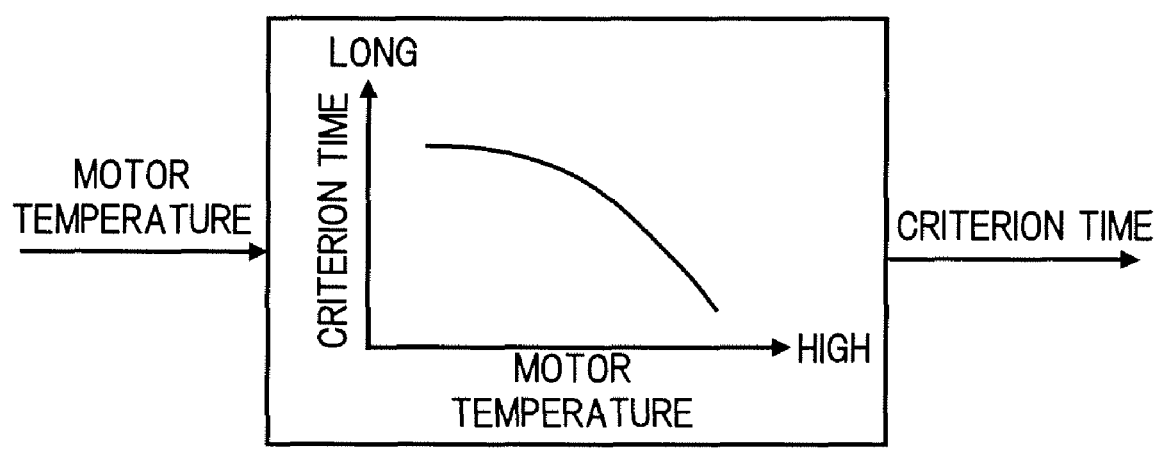
FIG. 18 is a block diagram illustrating a setting of criterion time according to the fifth embodiment.

Here, the motor temperature at which the shorter criterion time is switched to the longer criterion time is set to be lower than the motor temperature at which the longer criterion time is switched to the shorter criterion time, to thereby provide a hysteresis characteristic. Hence, hunting does not occur in a binary selection state even if the motor temperature fluctuates while the duty ratio is held at 100%. As shown in FIG. 18, the criterion time adapted to the motor temperature at a given time can be retrieved from a table that pre-stores the criterion time with respect to the motor temperature.

In the configuration of obtaining the criterion time from the table, the criterion time can be changed more finely with changes in the motor temperature. Even in the case where the correlation between the motor temperature and the criterion time cannot be approximated by a simple relational form, a desired criterion time can be set for the motor temperature.

The criterion time based on the motor temperature can be calculated on the basis of a linear function using the motor temperature as a variable.

In the case of changing the criterion time in almost proportional to the motor temperature, by obtaining the criterion time by multiplication with a linear function, the criterion time can be easily set.

In the case of setting the criterion time on the basis of the motor temperature, an average value of motor temperature during the period in which the duty ratio is held at 100% is obtained, and criterion time can be set on the basis of the average value.

In step S506, whether or not the time in which the duty ratio is held at 100% is equal to or longer than the criterion time set on the basis of the motor temperature is determined. When the time is equal to or longer than the criterion time, the control proceeds to step S507 where the failure determination is performed.

In steps S508 through S510, a fail-safe process similar to that in the steps S108 through S110 is executed.

In addition to the first through fifth embodiments, the criterion time can be set by combining two or more elements of the motor temperature, the lubricating oil temperature (or cooling water temperature), the power source voltage, and the start state.

In the foregoing embodiments, as the variable valve mechanism of changing the open characteristic of the engine valve by using the electric actuator, the variable valve lift mechanism of varying the valve lift amount and the valve operation angle of the intake valve by using the motor has been described. The engine valve, however, may be an exhaust valve, and the variable valve mechanism may be such a variable valve timing mechanism that varies the center phase of the valve operation angle of the engine valve by using the electric actuator, or such a variable valve mechanism that switches a cam by an electric actuator. The electric actuator includes not only a DC motor, a brushless motor but also known electric actuators such as a solenoid and an electromagnetic retarder.

The entire contents of Japanese Patent Application No. 2007-258128, filed Oct. 1, 2007 are incorporated herein by reference.

While only selected embodiments have been chosen to illustrate the present invention, it will be apparent to those skilled in the art from this disclosure that various change and modification can be made herein without departing from the scope of the invention as defined in the appended claims.

Furthermore, the foregoing description of the embodiments according to the present invention are provided for illustration only, and not for the purpose of limiting the invention as defined by the appended claims and their equivalents.

I claim:

1. A controlling apparatus for a variable valve mechanism operated by a motor, the variable valve mechanism being configured to vary an opening characteristic of an engine valve, the controlling apparatus comprising:
   a control unit configured to control a manipulated variable supplied to the motor on a basis of a target value of the opening characteristic and an actual opening characteristic;
   a diagnosis unit configured to determine occurrence of a failure in the variable valve mechanism when a criterion time of a state, in which the manipulated variable exceeds a threshold, is exceeded;

a temperature condition detecting unit configured to detect a condition which is correlated with temperature of the motor; and a criterion time setting unit configured to, when the temperature of the motor is higher, change the criterion time to be shorter than the criterion time when the temperature of the motor is lower.

2. The controlling apparatus according to claim 1, wherein the temperature condition detecting unit is configured to detect a power source voltage of the motor as the condition which is correlated with the temperature of the motor, and wherein the criterion time setting unit is configured to make a setting such that the higher the power source voltage is, the shorter the criterion time is.

3. The controlling apparatus according to claim 2, wherein the temperature condition detecting unit is configured to detect an average value of the power source voltage when the manipulated variable exceeds the threshold.

4. The controlling apparatus according to claim 1, wherein the temperature condition detecting unit is configured to detect the temperature of the motor, and wherein the criterion time setting unit is configured to make a setting such that the higher the temperature of the motor is, the shorter the criterion time is.

5. The controlling apparatus according to claim 1, wherein the temperature condition detecting unit is configured to detect an environment temperature of the motor as the condition which is correlated with the temperature of the motor, and wherein the criterion time setting unit is configured to make a setting such that the higher the environment temperature of the motor is, the shorter the criterion time is.

6. The controlling apparatus according to claim 1, wherein the temperature condition detecting unit is configured to detect the temperature of an engine as the condition which is correlated with the temperature of the motor, and wherein the criterion time setting unit is configured to make a setting such that the higher the temperature of the engine is, the shorter the criterion time is.

7. The controlling apparatus according to claim 1, wherein the temperature condition detecting unit is configured to detect whether an engine is starting or not as the condition which is correlated with the temperature of the motor, and wherein the criterion time setting unit is configured to set the criterion time longer during the starting of the engine than the criterion time after the starting of the engine.

8. The controlling apparatus according to claim 1, wherein the temperature condition detecting unit is configured to detect, as the condition which is correlated with the temperature of the motor, a power source voltage of the motor and the temperature of the motor, and wherein the criterion time setting unit is configured to make a setting such that the higher the power source voltage is, the shorter the criterion time is, and the higher the temperature of the motor is, the shorter the criterion time is.

9. The controlling apparatus according to claim 1, wherein the temperature condition detecting unit is configured to detect, as the condition which is correlated with the temperature of the motor, a power source voltage of the motor and an environment temperature of the motor, and wherein the criterion time setting unit is configured to make a setting such that the higher the power source voltage is, the shorter the criterion time is, and the higher the environment temperature of the motor is, the shorter the criterion time is.

10. The controlling apparatus according to claim 1, wherein the temperature condition detecting unit is configured to detect, as the condition which is correlated with the temperature of the motor, an average value of a power source voltage of the motor when the manipulated variable exceeds the threshold and the temperature of the motor, and wherein the criterion time setting unit is configured to make a setting such that, the higher the average value of the power source voltage is, the shorter the criterion time is, and the higher the temperature of the motor is, the shorter the criterion time is.

11. The controlling apparatus according to claim 1, wherein the temperature condition detecting unit is configured to detect, as the condition which is correlated with the temperature of the motor, an average value of a power source voltage of the motor when the manipulated variable exceeds the threshold and an environment temperature of the motor, and wherein the criterion time setting unit is configured to make a setting such that, the higher the average value of the power source voltage is, the shorter the criterion time is, and the higher the environment temperature of the motor is, the shorter the criterion time is.

12. The controlling apparatus according to claim 1, wherein each of a plurality of cylinder groups of an engine is provided with the variable valve mechanism, wherein the diagnosis unit is configured to diagnose whether or not a failure occurs in the variable valve mechanism on each of the plurality of cylinder groups, and wherein, in a case in which occurrence of a failure in the variable valve mechanism is determined in a part of the plurality of cylinder groups, the control unit is configured to set the opening characteristic of the variable valve mechanism determined to be faulty as the target value in the variable valve mechanism determined to be normal.

13. The controlling apparatus according to claim 1, further comprising a stopping unit configured to stop a driving of the motor when the diagnosis unit determines the occurrence of a failure in the variable valve mechanism.

14. The controlling apparatus according to claim 1, wherein the manipulated variable supplied to the motor is one of a duty ratio of a supply of power to the motor, a controlling current variable for controlling current of the motor, and a voltage controlling variable for controlling voltage of the motor.

15. The controlling apparatus according to claim 1, wherein the manipulated variable supplied to the motor is a duty ratio of a supply of power to the motor, and wherein the manipulated variable has exceeded the threshold when the duty ratio is held at 100%.

16. A controlling apparatus for a variable valve mechanism operated by a motor, the variable valve mechanism being configured to vary an opening characteristic of an engine valve, the controlling apparatus comprising:

control means for controlling a manipulated variable supplied to the motor on a basis of a target value of the opening characteristic and an actual opening characteristic;

diagnosis means for determining occurrence of a failure in the variable valve mechanism when a criterion time of a state, in which the manipulated variable exceeds a threshold, is exceeded;

temperature condition detecting means for detecting a condition which is correlated with temperature of the motor; and criterion time setting means for changing the criterion time, when the temperature of the motor is higher, to be shorter compared to the criterion time when the temperature of the motor is lower.

17. A method of controlling a variable valve mechanism operated by a motor, the variable valve mechanism being configured to vary an opening characteristic of an engine valve, the method comprising the steps of:

controlling a manipulated variable supplied to the motor on a basis of a target value of the opening characteristic and an actual opening characteristic;

when a criterion time of a state, in which the manipulated variable exceeds a threshold, is exceeded, determining occurrence of a failure in the variable valve mechanism and outputting a signal indicative of the occurrence of the failure;

detecting a condition which is correlated with temperature of the motor; and changing the criterion time to be shorter when the temperature of the motor is higher compared to the criterion time when the motor temperature is lower.

* * * * *